(12) United States Patent
Yoon et al.

(10) Patent No.: US 8,599,504 B2
(45) Date of Patent: Dec. 3, 2013

(54) PRISM SHEET HAVING PRISMS WITH WAVE PATTERN, BLACK LIGHT UNIT INCLUDING THE PRISM SHEET, AND LIQUID CRYSTAL DISPLAY DEVICE INCLUDING THE BLACK LIGHT UNIT

(75) Inventors: Ki Cheol Yoon, Cheonan (KR); Dong Yoon Shin, Chungcheongbuk-Do (KR); Ji Soo Ahn, Daejeon (KR); Sang Mi Kang, Daejeon (KR); Kil Seuk Byun, Yongin-si (KR); Seong Joong Kim, Seongnam-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 153 days.

(21) Appl. No.: 13/010,153

(22) Filed: Jan. 20, 2011

(65) Prior Publication Data

US 2011/0109837 A1  May 12, 2011

Related U.S. Application Data

(63) Continuation of application No. PCT/KR2009/003990, filed on Jul. 20, 2009.

(30) Foreign Application Priority Data

Jul. 23, 2008 (KR) .................. 10-2008-0071907

(51) Int. Cl.
  *G02B 5/04* (2006.01)
(52) U.S. Cl.
  USPC ............................ 359/831; 359/599; 362/608

(58) Field of Classification Search
  None
  See application file for complete search history.

(56) References Cited

U.S. PATENT DOCUMENTS

| | | |
|---|---|---|
| 5,530,764 A | 6/1996 | Uchida et al. |
| 5,797,668 A | 8/1998 | Kojima et al. |
| 2002/0057564 A1* | 5/2002 | Campbell et al. ............... 362/31 |
| 2004/0109663 A1 | 6/2004 | Olczak |
| 2006/0210770 A1 | 9/2006 | Nelson et al. |
| 2008/0037283 A1 | 2/2008 | Mi et al. |
| 2008/0247191 A1* | 10/2008 | Hsu .............................. 362/612 |

FOREIGN PATENT DOCUMENTS

| | | |
|---|---|---|
| CN | 101171536 A | 4/2008 |
| JP | 09-274184 A | 10/1997 |
| KR | 10 2005-0085418 A | 8/2005 |
| KR | 10 2007-0108567 A | 11/2007 |
| KR | 10 2008-0007532 A | 1/2008 |
| TW | 200823498 A | 6/2008 |

OTHER PUBLICATIONS

International Search Report in PCT/KR2009/003990 (WO 2010/011060 A3) dated Mar. 10, 2010 (Yoon, et al.).

Chinese Second Office Action in CN 200980128748.7, dated Dec. 5, 2012 (Yoon, et al.).

* cited by examiner

*Primary Examiner* — Arnel C Lavarias
*Assistant Examiner* — Jyotsna Dabbi
(74) *Attorney, Agent, or Firm* — Lee & Morse, P.C.

(57) ABSTRACT

A prism sheet, a backlight unit, and a liquid crystal display device, the prism sheet including a transparent substrate; and at least one prism on the transparent substrate, wherein a refractive index (n) and a basic angle (θ) of the at least one prism satisfies the following condition: $1 \leq n/\sin \theta \leq 4$.

13 Claims, 4 Drawing Sheets

PRISM SHEET HAVING PRISMS WITH WAVE PATTERN, BLACK LIGHT UNIT INCLUDING THE PRISM SHEET, AND LIQUID CRYSTAL DISPLAY DEVICE INCLUDING THE BLACK LIGHT UNIT

CROSS-REFERENCE TO RELATED APPLICATION

This application is a continuation of pending International Application No. PCT/KR2009/003990, entitled "Prism Sheet with Improved Front Brightness and Viewing Angle, Back Light Unit Having the Prism Sheet, and Liquid Crystal Display Device Having the Back Light Unit," which was filed on Jul. 20, 2009, the entire contents of which are hereby incorporated by reference.

BACKGROUND

1. Field

Embodiments relate to a prism sheet, a back light unit including the prism sheet, and a liquid crystal display device including the back light unit.

2. Description of the Related Art

Plasma display panels (PDPs), field emission display devices (FEDs), and thin film transistor liquid crystal display devices (TFT-LCDs) have been developed as flat panel display devices used in laptops, televisions, and mobile phones (due to demands for flat panel display devices to be thin, miniaturized, and to consume low power). TFT-LCDs that are thin and have excellent color reproducibility may be desirable.

PDPs and FEDs, from among flat panel display devices, self-emit, but TFT-LCDs do not self-emit light. Thus, TFT-LCDs may display an image by using a back light unit as a supplementary light source. The back light unit may include an edge type or a direct type surface light source structure in order to irradiate light uniformly onto an entire screen.

SUMMARY

Embodiments are directed to a prism sheet, a back light unit including the prism sheet, and a liquid crystal display device including the back light unit.

The embodiments may be realized by providing a prism sheet including a transparent substrate; and at least one prism on the transparent substrate, wherein a refractive index (n) and a basic angle ($\theta$) of the at least one prism satisfies the following condition: $1 \leq n/\sin\theta \leq 4$.

The refractive index (n) may be about 1.5 to about 1.7, and the basic angle ($\theta$) may be about 30° to 60°.

The at least one prism may have a triangular shaped cross-section.

A vertical angle of the at least one prism may be about 60° to 115°.

A width of a base of the at least one prism may be about 25 μm to 1 mm, and a height of the at least one prism may be about 5 μm to 600 μm.

The at least one prism may have a lengthwise wave pattern such that a height of the prism continuously or discontinuously changes along a length of the prism.

The lengthwise wave pattern may be formed such that a width of the prism continuously or discontinuously changes along the length of the prism.

The lengthwise wave pattern may have a repetition period, the repetition period of the lengthwise wave pattern being about 50 to about 100 times an average height of the prism.

The embodiments may also be realized by providing a back light unit including a prism sheet, the prism sheet including a transparent substrate; and at least one prism on the transparent substrate, wherein a refractive index (n) and a basic angle ($\theta$) of the at least one prism satisfies the following condition: $1 \leq n/\sin\theta \leq 4$.

The refractive index (n) may be about 1.5 to about 1.7, and the basic angle ($\theta$) may be about 30° to 60°.

The at least one prism may have a triangular shaped cross-section.

A vertical angle of the at least one prism may be about 60° to 115°.

A width of a base of the at least one prism may be about 25 μm to 1 mm, and a height of the at least one prism may be about 5 μm to 600 μm.

The at least one prism may have a lengthwise wave pattern such that a height of the prism continuously or discontinuously changes along a length of the prism.

The lengthwise wave pattern may be formed such that a width of the prism continuously or discontinuously changes along the length of the prism.

The lengthwise wave pattern may have a repetition period, the repetition period of the lengthwise wave pattern being about 50 to about 100 times an average height of the prism.

The embodiments may also be realized by providing a liquid crystal display device including the back light unit of an embodiment.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
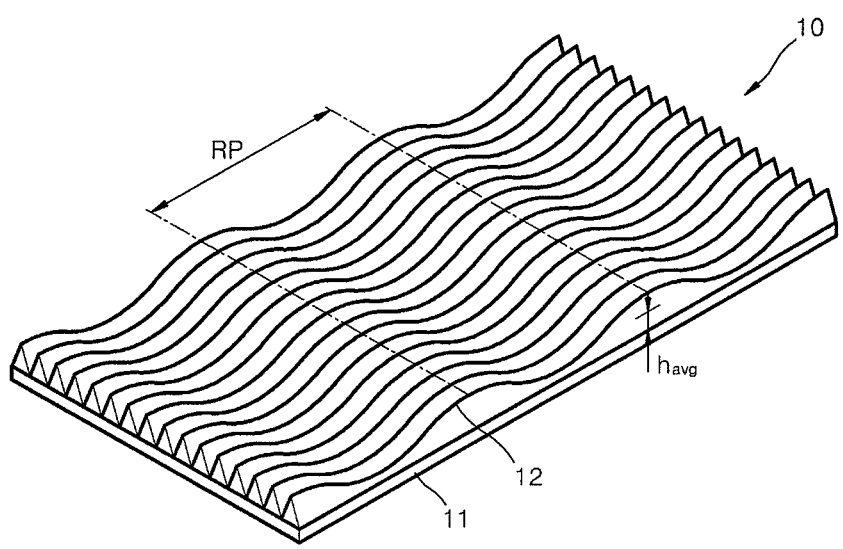
FIG. 1 illustrates a perspective view of a prism sheet according to an embodiment.

Korean Patent Application No. 10-2008-0071907, filed on Jul. 23, 2008, in the Korean Intellectual Property Office, and entitled: "Prism Sheet with Improved Front Brightness and Viewing Angle, Back Light Unit Having the Prism Sheet, and Liquid Crystal Display Device Having the Back Light Unit," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
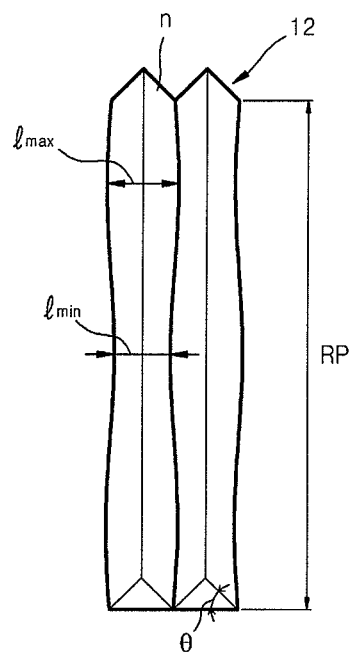
FIG. 2 illustrates a perspective view of a part of prisms in the prism sheet of FIG. 1.
Figure 3:
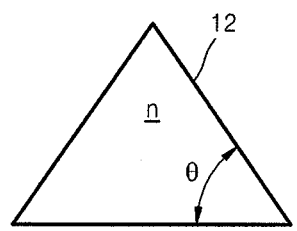
FIG. 3 illustrates a diagram of a widthwise cross-section of one of the prisms of the prism sheet of FIG. 1.

FIG. 1 illustrates a perspective view of a prism sheet according to an embodiment. FIG. 2 illustrates a perspective view of a part of prisms of the prism sheet of FIG. 1. FIG. 3 illustrates a diagram of a widthwise cross-section of one of the prisms of the prism sheet of FIG. 1.

Referring to FIGS. 1 through 3, the prism sheet 10 according to the present embodiment may include a transparent substrate 11 and a plurality of prisms 12.

The transparent substrate 11 may be formed of a material, e.g., a polyester resin, and may transmit light incident on the transparent substrate 11.

The prisms 12 may be disposed on the transparent substrate 11 and may focus light incident thereon via the transparent substrate 11 onto a flat surface of a liquid crystal display panel (not shown). In an implementation, the prisms 12 may be formed of the same material as the transparent substrate 11. However, the materials for forming the prisms 12 is not limited thereto.

In the prism sheet 10, a refractive index n and a basic angle θ of the prisms 12 may satisfy the following condition:

$$1 \leq n/\sin \theta \leq 4$$

For example, the refractive index n may be about 1.5 to about 1.7; and the basic angle θ may be about 30° to about 60°, but the embodiments are not limited thereto.

The prism sheet 10 having various combinations of the refractive index n and the basic angle θ may be manufactured under conditions such that the value of n/sin θ satisfies the above described condition. When the value of n/sin θ is greater than or equal to one, the prism sheet 10 may be manufactured relatively easily. When the value of n/sin θ is less than or equal to 4, sufficient front brightness and viewing angle may be relatively easy to obtain. This will be described in detail below with reference to examples.

In the above condition, the basic angle θ may denote either of two terminal angles of one side of the prisms 12 that contacts a base with respect to a widthwise cross-section of the prism, i.e., the flat surface of the transparent substrate 11, as shown in FIGS. 2 and 3. In an implementation, the two basic angles θ may be the same.

The prisms 12 may have a triangular shaped cross-section, wherein a width of a base thereof may be about 25 μm to about 1 mm, a height thereof may be about 5 μm to about 600 μm, and a vertical angle thereof may be about 60° to about 115°. The vertical angle may denote an interior angle of the prisms 12 facing the base with respect to the widthwise cross-section of the prisms 12. The cross-section of the prisms 12 is not limited to a triangular shape, and may include, e.g., rectangular, pentagonal, or arch shapes.

As shown in FIGS. 1 and 2, the prisms 12 may have a lengthwise wave pattern. For example, in the lengthwise wave pattern, the height of the prisms 12 may continuously or discontinuously change along the length of the prisms 12. By forming the prisms 12 with the lengthwise wave pattern, contact area between the prisms 12 and another optical film (not shown) deposited on the prism sheet 10 may be reduced, thereby reducing, e.g., contamination due to foreign substances, scratch due to contact, and/or visible defects. Accordingly, production of inferior products may be reduced and an undesirable wet out phenomenon may be prevented. Also, by forming the prisms 12 in the lengthwise wave pattern, optical overlap with an RGB pattern of the liquid crystal display panel may be reduced or prevented. Thus, an undesirable moiré phenomenon may be reduced or prevented.

The prisms 12 may be formed in such a way that the lengthwise wave pattern has a repetition period RP that is about 50 to about 100 times an average height $h_{avg}$ of the prisms 12.

Also, in the lengthwise wave pattern, not only the height but also the width of the prisms 12 may continuously or discontinuously change along the length. For example, in FIG. 2, $l_{max}$ and $l_{min}$ respectively denote the maximum width and the minimum width of the base of the prisms 12. For example, the width of the prisms 12 may be a width of the base along a line perpendicular to the height of the prisms 12.

The following Examples and Comparative Example are provided in order to set forth particular details of one or more embodiments. However, it will be understood that the embodiments are not limited to the particular details described. Further, the Comparative Example is set forth to highlight certain characteristics of certain embodiments, and is not to be construed as either limiting the scope of the invention as exemplified in the Examples or as necessarily being outside the scope of the invention in every respect.

Examples 1 through 9

A following simulation test was performed on a prism sheet having a structure similar to the prism sheet 10 of FIG. 1. Thus, relative front brightness and viewing angle according to a ratio between a refractive index n and a basic angle θ of a prism were able to be examined. The results of the simulation test are shown in Table 1, below, and in FIGS. 4A through 4C.

(Simulation Software)
LightTools 6.0 of Optical Research Association was used as software for computer simulation.
(Simulation Parameters)
Number of Ray: 3,000,000 Rays
Ray Power Threshold: 0.001
Source Total Power: 1 lumen
Angular distribution of Source: Lambertian
(Prism Sheet)
Width×Length: 12.7 cm×8.89 cm
Height of Prism: 24.5~26.5 μm
Width of Base of Prism: 48~52 μm
Repetition Period of Lengthwise Wave Pattern: 1,500 μm
Refractive Index of Transparent Substrate: 1.59
Refractive Index n of Prism: 1.48, 1.54, 1.60, 1.45515, and 1.62485
Basic Angle θ of Prism: 37.9289°, 40°, 45°, 50°, and 52.0711°
Reference: Vikuiti BEF II 90/50 from 3M Comparative Example 1

A simulation test was performed in the same manner as Examples 1 through 9, except that a refractive index n and a basic angle θ of a prism were respectively 1.54 and 20°.

TABLE 1

| Examples | Refractive Index (n) of Prism | Basic Angle (θ), [°] of Prism | n/sin θ | Relative Front Brightness | Viewing Angle [°] |
|---|---|---|---|---|---|
| Example 1 | 1.54 | 37.9289 | 2.501 | 0.913 | 80.812 |
| Example 2 | 1.48 | 40 | 2.302 | 0.891 | 82.22 |
| Example 3 | 1.6 | 40 | 2.489 | 0.9813 | 76.029 |
| Example 4 | 1.45515 | 45 | 2.058 | 0.8677 | 80.18 |

TABLE 1-continued

| Examples | Refractive Index (n) of Prism | Basic Angle (θ), [°] of Prism | n/sin θ | Relative Front Brightness | Viewing Angle [°] |
|---|---|---|---|---|---|
| Example 5 | 1.54 | 45 | 2.178 | 0.9618 | 73.359 |
| Example 6 | 1.62485 | 45 | 2.298 | 1.071 | 62.84 |
| Example 7 | 1.48 | 50 | 1.932 | 0.8388 | 76.36 |
| Example 8 | 1.6 | 50 | 3.216 | 0.9079 | 60.856 |
| Example 9 | 1.54 | 52.0711 | 1.954 | 0.8621 | 63.949 |
| Comparative Example 1 | 1.54 | 20 | 4.5 | 0.707 | 105.90 |
| Reference | — | — | — | 1.000 | 67.72 |

In Table 1, relative front brightness was a value obtained by dividing a value of front brightness of the prism sheet according to each of Examples 1 through 9 and Comparative Example 1 by the front brightness of a reference prism sheet, i.e. BEF II.

Figure 4A:
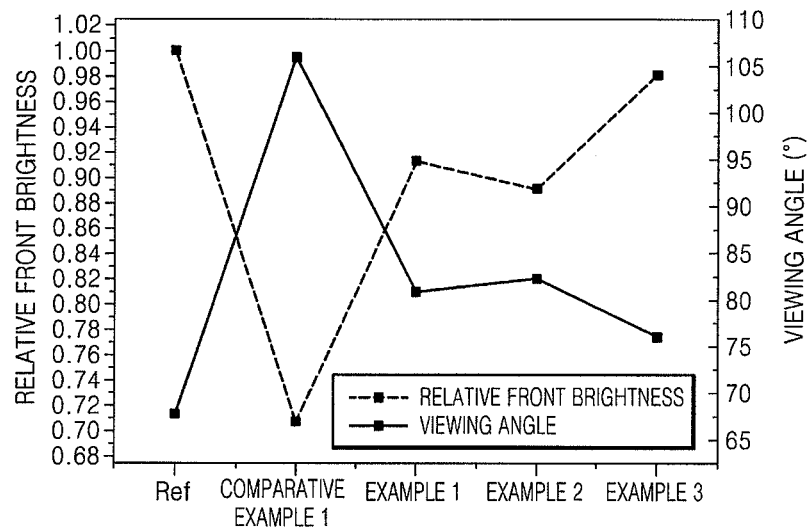
FIGS. 4A through 4C illustrate graphs showing simulation results of relative front brightness and viewing angle according to a ratio between a refractive index and a basic angle of prisms of prism sheets prepared according to Examples and a Comparative Example.
Figure 4B:
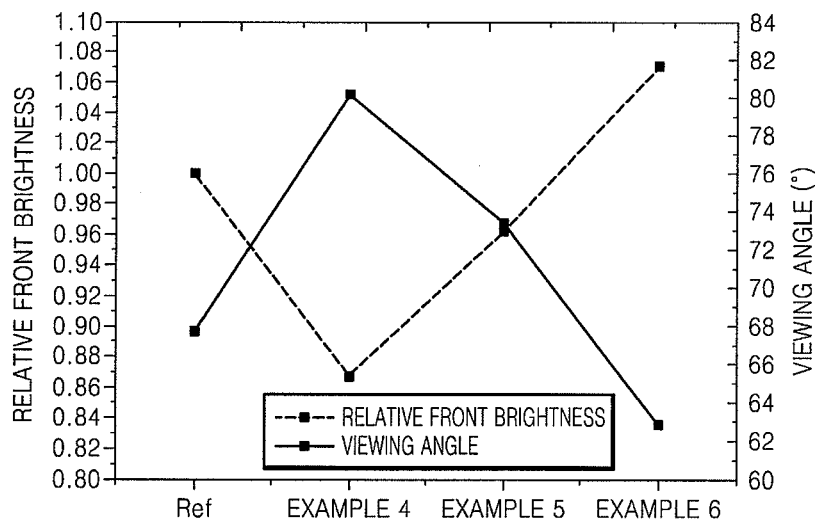
Figure 4C:
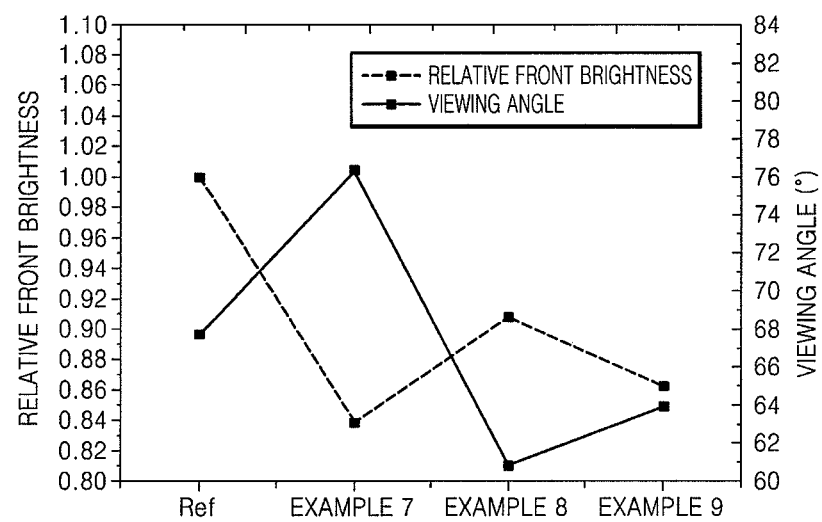

Referring to Table 1 and FIGS. 4A through 4C, when the value of n/sin θ was not within a range of 1 to 4, e.g., as in Comparative Example 1, at least one of the relative front brightness and the viewing angle remarkably deteriorated.

By way of summation and review, a back light unit may include a prism sheet that concentrates light onto a flat surface of the TFT-LCD by adjusting an emitting angle of the light. Such a prism sheet may be variously manufactured according to various design purposes, e.g., high light concentrating efficiency, wide viewing angle, moiré phenomenon prevention, and prevention of optical wet out with another film. Various designs, e.g., a shape of a prism and an angle of an inclined plane of the prism, may be modified according to each design purpose. Prism sheets may increase basic performances by changing the height or angle of a prism.

The embodiments provide a prism sheet having an improved front brightness and viewing angle by adjusting a ratio between a refractive index and a basic angle of a prism.

The embodiments also provide a prism sheet having an improved production yield by additionally including at least one prism having a lengthwise wave pattern having a predetermined repetition period.

The embodiments also provide a backlight unit including the prism sheet and a liquid crystal display device including the back light unit, wherein a front brightness and a viewing angle are improved and wet out phenomenon and moiré phenomenon are prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A prism sheet, comprising:
a transparent substrate; and
at least one prism on the transparent substrate,
wherein a refractive index (n) and a basic angle (θ) of the at least one prism satisfies the following condition: $1 \leq n/\sin\theta \leq 4$,
wherein the at least one prism has a lengthwise wave pattern, such that a height of the prism continuously or discontinuously changes along a length of the prism, and a width of the prism continuously or discontinuously changes along the length of the prism, and
wherein the lengthwise wave pattern has a repetition period, the repetition period of the lengthwise wave pattern being about 50 to about 100 times an average height of the prism.

2. The prism sheet as claimed in claim 1, wherein:
the refractive index (n) is about 1.5 to about 1.7, and
the basic angle (θ) is about 30° to 60°.

3. The prism sheet as claimed in claim 2, wherein the at least one prism has a triangular shaped cross-section.

4. The prism sheet as claimed in claim 3, wherein a vertical angle of the at least one prism is about 60° to 115°.

5. The prism sheet as claimed in claim 3, wherein:
a width of a base of the at least one prism is about 25 μm to 1 mm, and
a height of the at least one prism is about 5 μm to 600 μm.

6. The prism sheet as claimed in claim 1, wherein the transparent substrate and at least one prism are arranged to have light incident on the transparent substrate before the at least one prism.

7. A back light unit comprising a prism sheet, the prism sheet including:
a transparent substrate; and
at least one prism on the transparent substrate,
wherein a refractive index (n) and a basic angle (θ) of the at least one prism satisfies the following condition: $1 \leq n/\sin\theta \leq 4$,
wherein the at least one prism has a lengthwise wave pattern, such that a height of the prism continuously or discontinuously changes along a length of the prism, and a width of the prism continuously or discontinuously changes along the length of the prism, and
wherein the lengthwise wave pattern has a repetition period, the repetition period of the lengthwise wave pattern being about 50 to about 100 times an average height of the prism.

8. The back light unit as claimed in claim 7, wherein:
the refractive index (n) is about 1.5 to about 1.7, and
the basic angle (θ) is about 30° to 60°.

9. The back light unit as claimed in claim 7, wherein the at least one prism has a triangular shaped cross-section.

10. The back light unit as claimed in claim 9, wherein a vertical angle of the at least one prism is about 60° to 115°.

11. The back light unit as claimed in claim 9, wherein:
a width of a base of the at least one prism is about 25 μm to 1 mm, and
a height of the at least one prism is about 5 μm to 600 μm.

12. A liquid crystal display device comprising the back light unit as claimed in claim 7.

13. The prism sheet as claimed in claim 7, wherein the transparent substrate and at least one prism are arranged to have light incident on the transparent substrate before the at least one prism.

* * * * *